Figure 1:
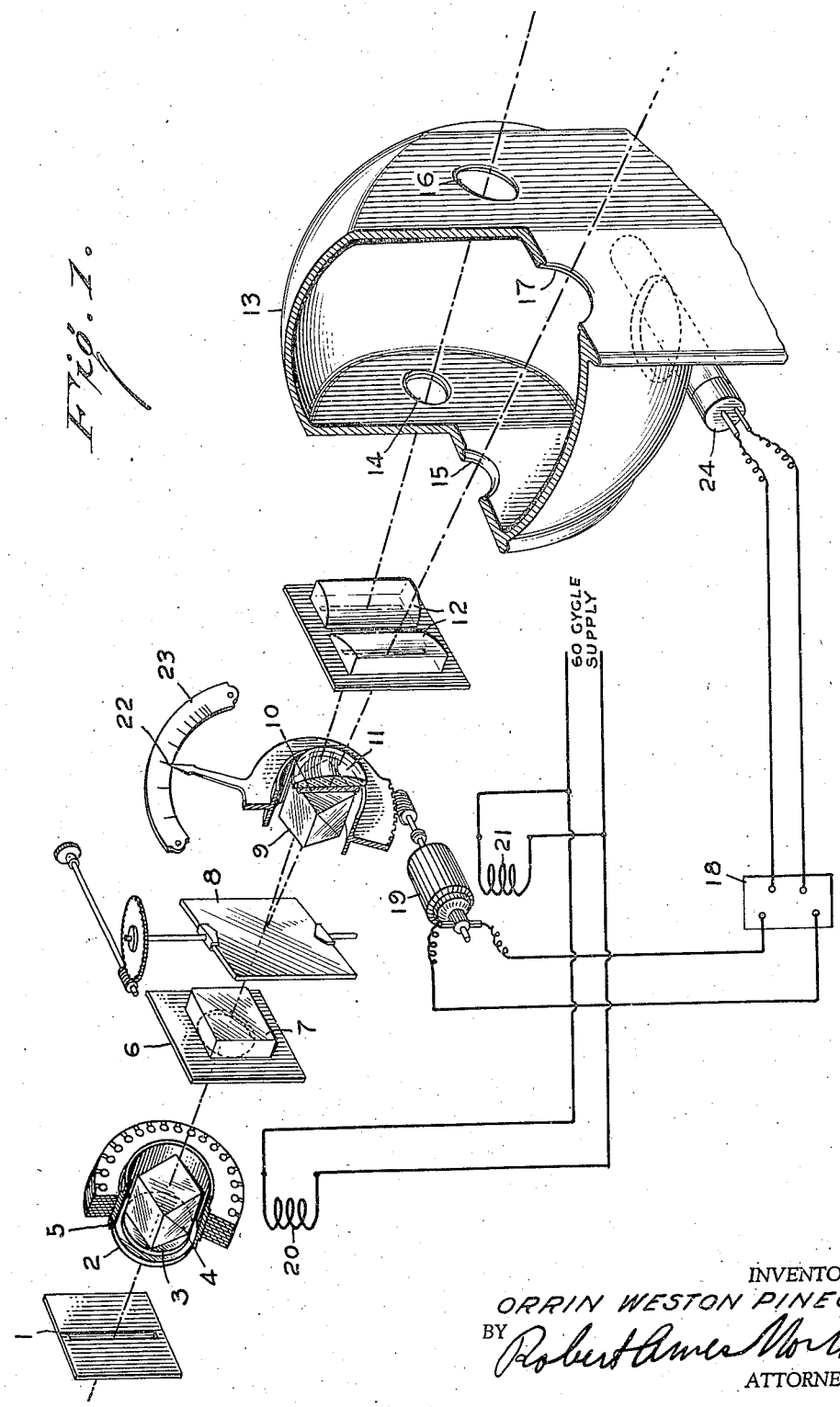

July 2, 1940.   O. W. PINEO   2,206,575
SPECTROPHOTOMETER
Filed April 16, 1938   3 Sheets-Sheet 1

INVENTOR.
ORRIN WESTON PINEO,
BY
ATTORNEY.

July 2, 1940.　　　O. W. PINEO　　　2,206,575
SPECTROPHOTOMETER
Filed April 16, 1938　　　3 Sheets-Sheet 2

July 2, 1940.   O. W. PINEO   2,206,575
SPECTROPHOTOMETER
Filed April 16, 1938   3 Sheets-Sheet 3

INVENTOR.
ORRIN WESTON PINEO,
BY Robert Ames Norton
ATTORNEY.

Patented July 2, 1940

2,206,575

UNITED STATES PATENT OFFICE 2,206,575

SPECTROPHOTOMETER

Orrin W. Pineo, Milo, Maine, assignor, by mesne assignments, to American Cyanamid Company, New York, N. Y., a corporation of Maine Application April 16, 1938, Serial No. 202,384

7 Claims. (Cl. 88—14)

This invention relates to spectrophotometers of a flickering beam type using a polarizing prism as a photometering element.

In the past it has been proposed to build spectrophotometers in which the arrangement of optical elements is such that the photometer prism is between the sample and standard and the beam splitting prism whereas the flicker mechanism which includes a rotating polarizing element is on the opposite side of the beam splitting prism. Such a spectrophotometer is described in the patent to Hardy No. 1,987,441, issued January 8, 1935. This type of flickering beam spectrophotometer is open to two serious disadvantages. In the first place, the light obtained from any ordinary monochromator contains an amount of polarized light which varies with wave length. The polarized beam leaving the rotating flicker prism consequently has an undesirable periodic intensity variation which superposes on the desired variations, produced by the flicker mechanism, to cause an offset from the true balance position of the photometer prism. In other words, the spectrophotometer does not measure the relative transmission or reflectance of sample and standard, but rather measures the same multiplied by a factor depending on the particular source and monochromator used and on the particular wave length setting of the monochromator.

Another serious disadvantage of the type of spectrophotometer proposed is that the beams striking sample and standard are plane polarized in a plane depending upon the setting of the photometer prism, that is to say, depending on the balance position which the prism assumes as a measure of the relative reflectance or transmission of sample and standard. Consequently, in the case of samples which do not respond uniformly to polarized illumination in all planes of polarization, an undesirable specification of the measurement obtains wherein the mode of measurement depends on the result of the measurement.

The first error, that is to say, the effect of polarization in the monochromator, is normally the larger of the two and is the one most necessary to correct, particularly as in the case of many samples, the second effect is not observed and in general when measuring transmission, there is no non-uniform response to polarized light in different planes. Therefore, if the large error due to polarization in the monochromator is eliminated, the machine will give fairly accurate readings for a large number of samples and the error in other samples is comparatively smaller than that introduced by monochromator polarization.

Accordingly in its broader aspects, the present invention is particularly concerned in eliminating the effects of varying degrees of polarization in the monochromator. In a more specific modification, however, the compensation of both errors is included.

Essentially the present invention depends on the fact that a quarter wave plate or a suitable Fresnel rhomb or other device having the same typical effect will transform plane polarized light into light of circular polarization. When light from a monochromator having various degrees of plane polarization at different wave lengths is passed through a device such as a quarter wave plate which transforms the plane polarized light into circularly polarized light, the circularly polarized light will be uniformly transmitted by the rotating flicker prism without the introduction of any spurious flicker signal.

Similarly a quarter wave plate or Fresnel rhomb can be placed in the two beams after the photometer prism. This will result in transforming the plane polarized beams leaving the photometer prism into circularly polarized beams and rotation of the prism will have no effect on the measurement since a circle is symmetrical with regard to rotation about its axis and circular polarization is reflected uniformly by the sample regardless of its response to plane polarized light of various planes of polarization.

A quarter wave plate behaves as such for only one wave length of light. Thus, if a quarter wave plate is employed which is an exact quarter wave plate for light in the middle of the spectrum, say green, it will not be exactly a quarter wave plate for light of different wave lengths. However, the change in the character of the plate is gradual and in the case of light differing in wave length from that for which the plate is designed the transformation will be into elliptically polarized light, the eccentricity of the ellipse increasing as the wave length of light deviates from that for which the plate is exactly a quarter wave plate. The correction of a quarter wave plate as used in the present invention is therefore perfect only for one wave length of light in the spectrum. However, even in the other ranges of the visible spectrum the ellipse is of sufficiently small eccentricity so that the effect of polarization in the monochromator is eliminated to a very large extent.

A Fresnel rhomb presents optical advantages over a quarter wave plate because the eccentricity of the elliptically polarized light produced varies more slowly with change of wave length than is the case with a quarter wave plate. Optically, therefore, the rhomb gives more accurate correction over a wider range of the spectrum. Mechanically, however, it is more difficult to use a rhomb if the latter is to be attached either to the flicker prism or to the photometer prism because the axis of the rhomb does not coincide with the axis of the flicker or photometer element and the problem of optical alignment presented is therefore a serious one. For practical purposes, therefore, the rhomb is used only where it can be employed in a stationary position. However, its attachment to the rotating elements of the system is entirely possible, even though complicated, and therefore the broad invention is not limited to a stationary location when a rhomb is used.

Figure 2:
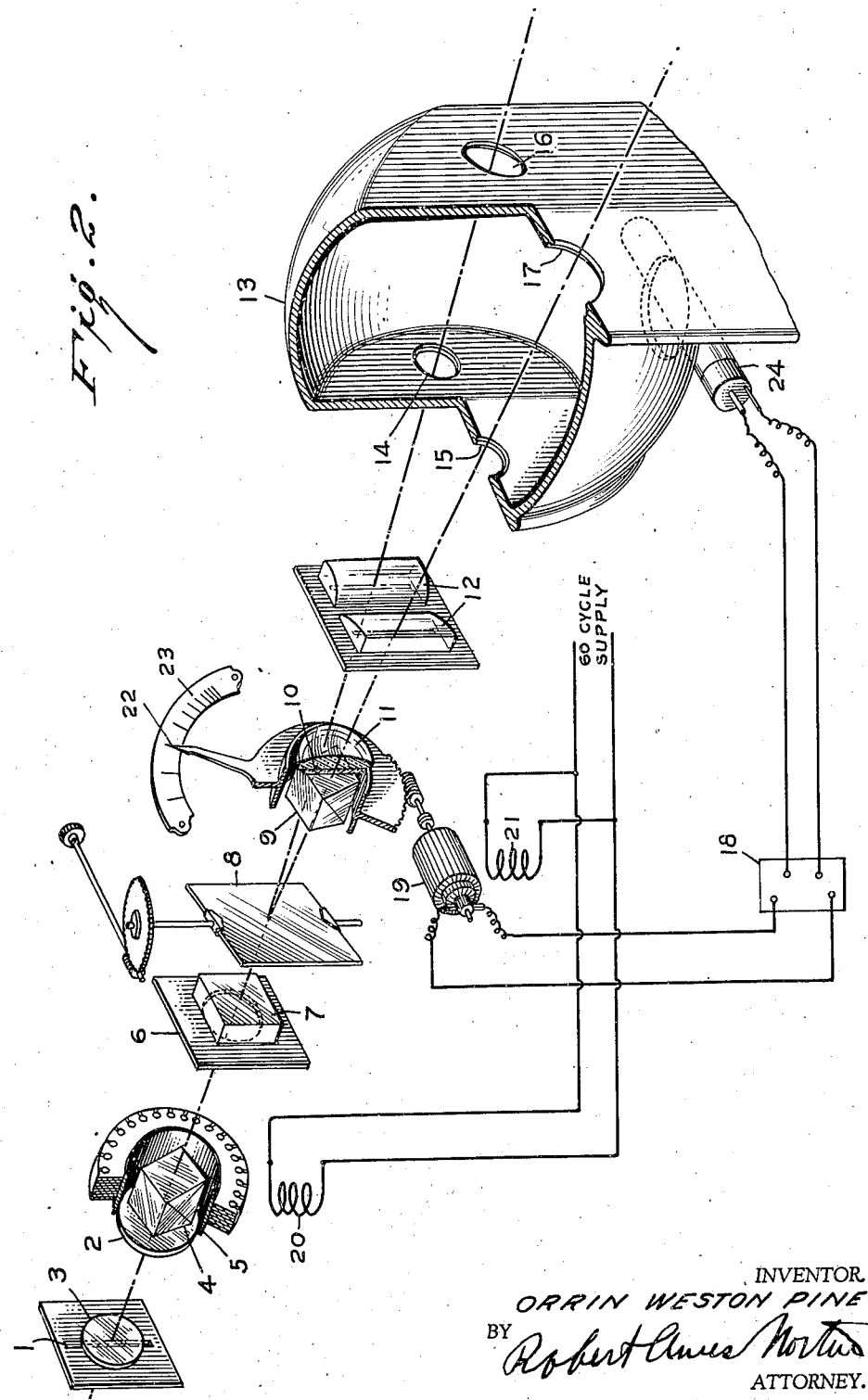
Figure 3:
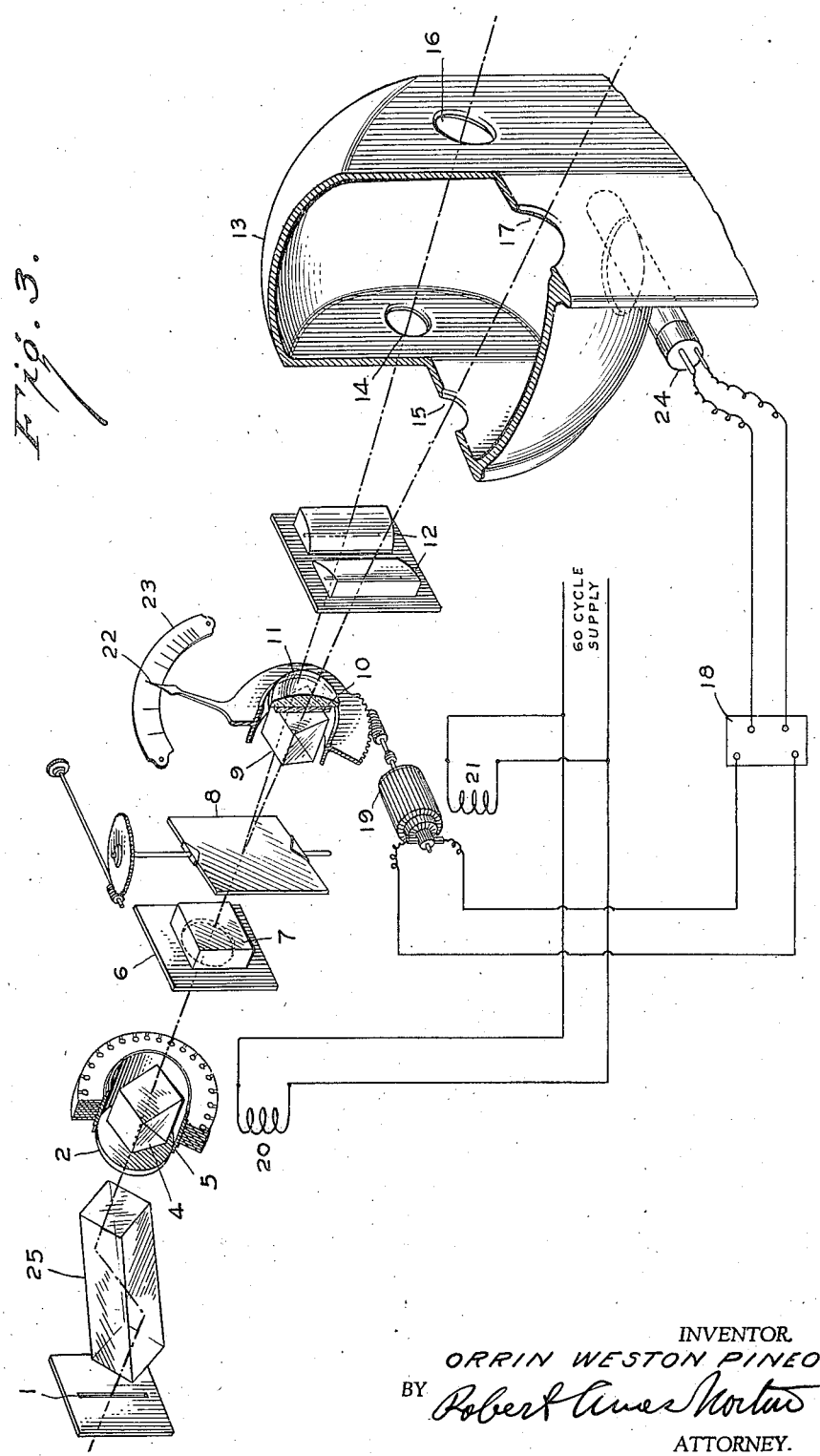

The invention will be described in greater detail in conjunction with the drawings in which Fig. 1 is a perspective view, partly broken away, showing electrical elements in schematic form of a spectrophotometer of the present invention using quarter wave plates attached to the two moving optical elements;

Fig. 2 is a perspective drawing, partly broken away, with electrical elements in schematic form in which a stationary quarter wave plate is used for monochromator correction; and Fig. 3 is a perspective drawing, partly broken away, similar to Fig. 2 but showing a Fresnel rhomb in place of a stationary quarter wave plate.

In the device shown in Fig. 1, light leaving the exit slit 1 of a conventional monochromator (not shown) passes through a converging lens 2, a quarter wave plate 3 and a polarizing prism, such as a Rochon prism, 4. The lens, plate and prism are cemented together and are mounted in the hollow sleeve 5 of a synchronous motor. The polarized beam leaving the prism 4 passes through a Wollaston prism 7 provided with a circular stop 6 and is split into two beams plane polarized at right angles to each other. These beams pass through a transparent plate 8 for adjusting purposes and then through the photometering Rochon prism 9 to which is cemented quarter wave plate 10 and a lens 11. The light then passes through two diverging lenses 12 and enters an integrating sphere 13 through openings 14 and 15, aligned with the openings 16 and 17 in the edge of the sphere.

For measuring transmission samples, they are placed in opening 15 and uniform reflecting surfaces such as for example magnesium carbonate standards are placed over the openings 16 and 17. In the case of reflectance measurements, the openings 14 and 15 are unobstructed and a standard such as magnesium carbonate is placed over opening 16 and the samples to be measured over the opening 17.

In the case of either transmission or reflectance, if the total amount of light transmitted or reflected by standard and sample during one cycle is the same, there will be no fluctuation of light in the integrating sphere because as one beam increases, the other decreases. If, however, the total light transmitted or reflected by the sample during one cycle is different from that from the standard, then the sum of light from sample and standard will flicker. For ordinary purposes 60 cycles is used as the frequency for flickering as this is readily obtained from most standard electric light mains and the synchronous motor 5 is provided with the necessary number of poles so that it rotates at 1800 R. P. M. Any fluctuation of light in the integrating sphere is picked up by the photoelectric cell 24 arranged below an opening in the sphere and generates a very weak alternating current of 60 cycles. This is passed into a high gain audiofrequency amplifier 16 provided with out-put tubes capable of delivering a considerable amount of power. The out-put is fed to the armature 19 of the motor driving the photometering prism 9. The fields 20 and 21 of the flicker motor and the photoelectrically driven motor are connected to the 60 cycle supply line. As the motor 19 rotates, it moves the photometering prism until the effect on the beams is such that a balance is obtained and no fluctuation of light is noted in the integrating sphere. The motor 19 is so arranged that it rotates in different directions depending on the phase of the alternating current fed to its armature which in turn is predetermined by the particular beam that is stronger in the integrating sphere. The photometering prism will therefore always tend to be turned to a point at which the light in the integrating sphere ceases to fluctuate. A pointer 22 mounted on the drive of the photometering prism indicates the variations in reflectance and transmission between sample and standard on the scale 23 which is not a linear scale because the variations of transmission or reflectance compensated for by the rotation of the photometering prism are in proportion to the square of the tangent of the angle through which the prism is turned. Any other indicating means such as automatic recording means and the like may, of course, be substituted for the pointer and scale but form no part of the present invention. When two white standards are used, it is necessary to adjust the machine at the start so that for 100% reflectance the pointer will read at 100% on the scale. This is effected by a slight turning of the plate 8. Once the adjustment is made so that the pointer reads 100%, this adjustment remains throughout the life of the machine unless changes in the elements result in a shift whereupon a readjustment is easily effected.

Fig. 1 is shown with a quarter wave plate between monochromator and flicker mechanism and a second quarter wave plate between the photometer prism and integrating sphere. As has been pointed out above, these plates perform different functions, the plate 3 attached to the flicker prism compensating for polarization in the monochromator and the other plate 10 attached to the photometering prism giving a sample illuminating beam whose polarization does not change with photometer prism orientation. The second plate can be eliminated if its function is not desired.

Fig. 2 shows a spectrophotometer similar to Fig. 1, the same parts bearing the same numbers, but instead of cementing the quarter wave plate 3 to the flicker prism 4 it is mounted in a stationary position adjacent to the monochromator exit slit. The operation is similar and the effect is the same as in Fig. 1.

Fig. 3 shows a device similar to Fig. 2 in which the quarter wave plate 3 has been substituted by a Fresnel rhomb 25 which transforms plane polarized light into circularly polarized light. As has been pointed out above the Fresnel rhomb presents some optical advantages over a quarter wave plate because the eccentricity of the elliptically polarized light produced thereby varies more slowly with change of wave length. The operation of the device remains however substantially the same.

What I claim is:

1. A photometric apparatus comprising a photoelectric device arranged to receive integrated light from a sample and a standard, an optical system arranged to control the light received by said device comprising in optical alignment a source of monochromated light of selectable wave length, a member capable of transforming plane polarized light into elliptically polarized light, the ellipse having zero eccentricity at one wave length in the visible spectrum, a rotating plane polarizing member, a third member having the property of dividing a light beam into two beams which are polarized respectively in planes at right angles to each other, an angularly movable polarizing member between the third member and the sample and standard and means by which the last member may be angularly adjusted in accordance with the out-put of the photoelectric device.

2. A photometric apparatus comprising a photoelectric device arranged to receive integrated light from a sample and a standard, an optical system arranged to control the light received by said device comprising in optical alignment a source of monochromated light of selectable wave length, a member capable of transforming plane polarized light into elliptically polarized light, the ellipse having zero eccentricity at one wave length in the visible spectrum, a rotating plane polarizing member synchronously driven by alternating electric current of a predetermined frequency, a third member having the property of dividing a light beam into two beams which are polarized respectively in planes at right angles to each other, an angularly movable polarizing member between the third member and the sample and standard, electric driving means for the angularly adjustable member having a field fed by an alternating electric current of twice the frequency of rotation of the synchronously rotated polarizing member, said driving means receiving driving current from the output of an amplifier capable of amplifying alternating currents, the in-put to said amplifier being connected to the photoelectric device and the electric driving means being so adjusted as to cause the angularly adjustable polarizing member to rotate in a direction to produce the same total light from sample and standard.

3. A photoelectric device according to claim 1 in which a device for transforming plane polarized light into elliptically polarized light, the eccentricity of which is zero for one wave length in the visible spectrum, is introduced between the angularly adjustable polarizing member and the sample and standard.

4. A photoelectric device according to claim 1 in which the member capable of transforming plane polarized light into elliptically polarized light is a rotating plate which is a quarter wave plate for said one wave length in the visible spectrum.

5. A photoelectric device according to claim 2 in which the member capable of transforming plane polarized light into elliptically polarized light is a rotating plate which is a quarter wave plate for said one wave length in the visible spectrum.

6. A photoelectric device according to claim 1 in which the member capable of transforming plane polarized light into elliptically polarized light is a Fresnel rhomb.

7. A photoelectric device according to claim 2 in which the member capable of transforming plane polarized light into elliptically polarized light is a Fresnel rhomb.

ORRIN W. PINEO.